S. W. SOULE, dec'd.
BETSEY C. SOULE, Adm'x.

Paper-Cutting Machine.

No. 6,710.

Reissued Oct. 19, 1875.

WITNESSES

F. B. Townsend.

Jno. D. Patten

By

Betsy C. Soule administratrix of S. W. Soule

INVENTOR

R. W. Smith

Attorney

N. PETERS, PHOTO-LITHOGRAPHER, WASHINGTON, D. C.

UNITED STATES PATENT OFFICE.

BETSEY C. SOULE, OF BROOKLYN, NEW YORK, ADMINISTRATRIX OF SAMUEL W. SOULE, DECEASED.

IMPROVEMENT IN PAPER-CUTTING MACHINES.

Specification forming part of Letters Patent No. 149,690, dated April 14, 1874; reissue No. 6,710, dated October 19, 1875; application filed August 24, 1875.

*To all whom it may concern:*

Be it known that SAMUEL W. SOULE, formerly of New York city, but more recently of Brooklyn, Kings county, in the State of New York, has invented, made, and used a new and useful Machine for Cutting Paper; and that the following is a full, clear, and exact description thereof, reference being had to the accompanying drawings, forming a part of this specification.

Figure 1:
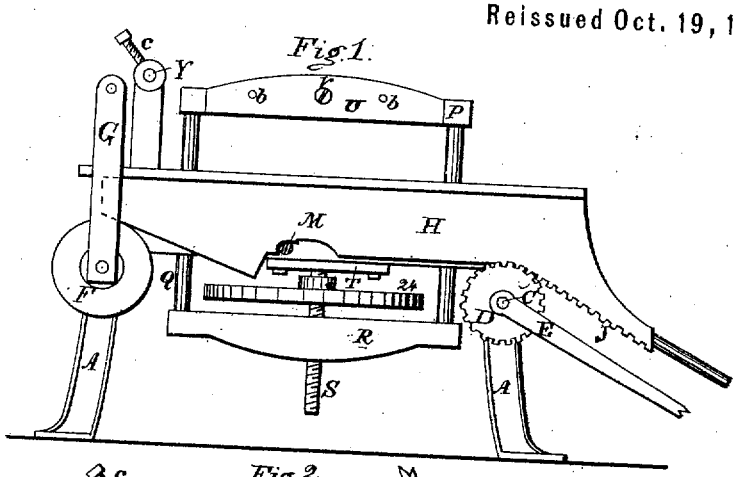
Figure 2:
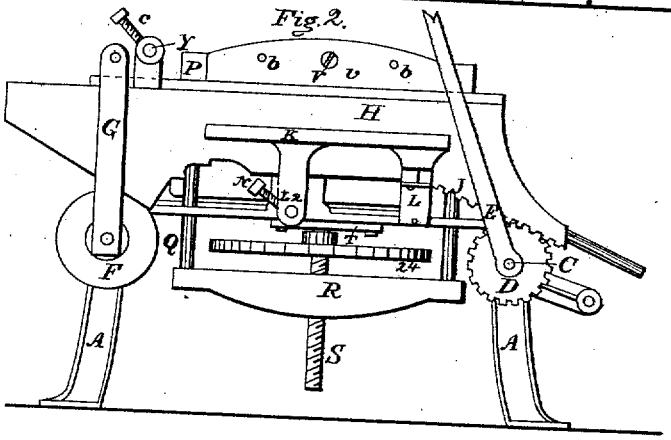
Figure 3:
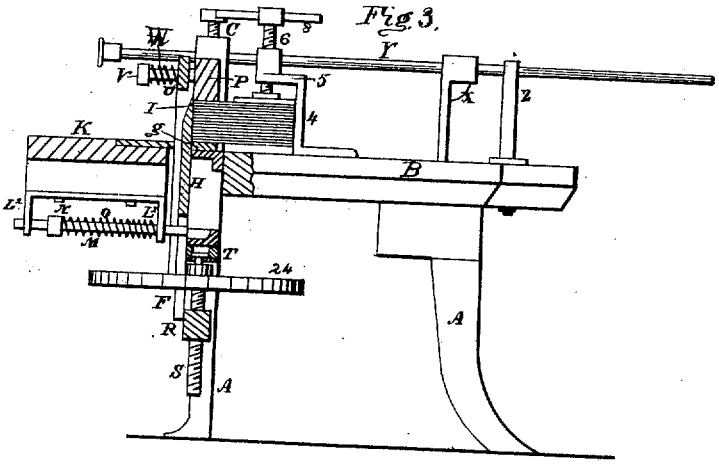

Figure 1 is a front elevation, the front table being removed, and the knife being in position to begin work. Fig. 2 is a front view of the same, the knife being shown after cutting. Fig. 3 is a transverse section.

In the drawings, similar characters refer to like parts.

This invention chiefly consists in having an under-cutting knife to cut the paper from the under side; in having this undercut-knife operating from under the table upward, in combination with an adjustable clamp, operating above and upon the table; in having a yielding table operated by, and close at all times to, the knife; in operating the knife and knife-bar by a cog-wheel and rack in the line of motion; in supporting the knife-bar at its opposite ends on revolving supports; in the tripod construction of the frame and table; in the mode of operating the adjustable clamp; and in the general construction and arrangement of the whole machine, all of which will more fully hereinafter appear.

In the drawings, A shows a frame for supporting the operative parts of the machine, and B is a table upon which the paper to be cut is placed. Held in the frame is one end of shaft C, having fast to it cog-wheel D, and attached to it a handle-lever, E, or suitable gearing for other than hand-power. Upon the opposite side of frame A is a roller, F, free to revolve upon its axis. Upon this spindle is also held one end of guide-bar G, the opposite end of the same being held upon a stud inserted in the upright portion of the frame A. H shows the knife-bar supporting the knife I. This knife-bar has gearing J attached to one end of its inclined bottom edge, in direct line with its motion, while the opposite end is inclined in like direction, so that, when placed in position, the gearing shall engage with the cog-wheel D, and the opposite inclined end shall rest upon roller F, thus securing to the knife-bar an upward diagonal motion, and cut from below the table upward. K shows the yielding front table of the machine, made movable for the purpose of clearing the knife-bar from the table, and so operating as to keep close to the knife and prevent the dropping down of the cuttings. The drawing shows one construction of the table K, in which it is supported by brackets L and $L^2$, one of which is provided with a steady-pin entering into the frame A, and the bracket $L^2$ being provided with openings, so that they may be passed over a rod, M, projecting from the frame A. Passed over this rod M, and confined between the rear bracket $L^2$ and a collar, N, held upon the rod M by a set-screw, *a*, is a spiral spring, O′. The clamping device by which the paper to be cut is secured consists of a plate, P, and plate R, connected by the side rods Q. The plate R is provided, about centrally, with an opening having a female-screw thread, with which the male screw S engages. A hand-wheel, 24, is secured upon the end of this male screw S, and between the cross-bars P and R and the upper end of the screw S is free to revolve in a bracket, T, secured to the under side of frame A. To the front of the cross-bar P is held a plate, U, a screw, V, passing through this secondary plate, and having a spiral spring, W, passing over it, and having its bearing upon the secondary plate U and the head of the screw V. Pins *b*, inserted in the top plate P, and entering openings in the secondary plate, steady and guide the same as it moves, as described hereinafter. *x* shows the paper-gage of the machine. This consists of a plain plate of metal, made true upon its face and bottom edge, secured upon the rod Y, which rod is free to move in openings in the upright portion of the frame A and the standard Z. A set-screw, *c*, inserted in the upright, is used to hold the paper-gage in any desired position.

The operation is as follows: The knife-bar and knife are placed in position in the machine, the gearing upon one end of the knife-bar engaging with the cog-wheel, and the opposite inclined end resting upon the roller, as shown in Fig. 1. The gage *x* of the machine is then placed in the desired position and secured, and the paper to be cut is put upon the table B. The operator, at front of the table, turns the hand-wheel 24, which operates the clamping device and brings down the top plate firmly upon the paper, confining it to the table B. By grasping lever or handle E and turning the shaft G, the cog-wheel engages with the gearing J upon the knife-bar H, and diagonally elevates the same, giving to the knife I a lateral movement through the paper, the opposite end of the knife-bar rising upon roller F, and being guided by the guide-bar G. As the knife passes through the paper the front or yielding table K yields to correspond with the increased thickness of the knife and bar, and clears the paper cut off from the bar. As the same is thrown forward the spiral spring O, held upon the rod M, between bracket $L^2$ and the collar, is compressed, and, after the knife passes through the paper, the plate U, attached to the plate P, yields to the knife and is thrown forward, compressing the spiral spring W between itself and screw V. By reversing the movement thus described the reverse action takes place, the knife descending below the table B, and the yielding table K regaining its former position.

The lever E can be placed in any desired position before cutting by raising the end of the knife-bar out of gear with the pinion, and, having turned the lever in the desired position, restoring the knife-bar.

When the knife-bar recedes, it is arrested at its farthest extreme by the rod M, which is desirable in cutting paper on the table B; but when paper is cut by a pattern, then the knife is to be arrested by a stop against which the lever strikes. The knife-bar can be placed in any desired position by resting the lever against a stop and raising the bar up out of gear, and pushing it up or down, as may be desired.

What I claim as the invention of SAMUEL W. SOULE is—

1. The table and clamp of a paper-cutting machine combined with a knife and knife-bar beneath said table, and operating with an upward cut, as set forth.

2. The yielding table K, combined with the knife of a paper-cutter, substantially as and for the purpose set forth.

3. The combination of the knife-bar H, roller F, rack J, shaft C, and pinion D, substantially as and for the purpose set forth.

4. The combination of the cross-bars P and R, side rods Q, hand-wheel 24, and screw S, knife I, and yielding plate U, substantially as and for the purpose set forth.

5. The combination of the gage *x*, rod Y, and set-screw *c*, the rod sliding longitudinally and capable of being partly rotated, so that the gage may be moved along the table, and turned off and away from the table, for the purposes set forth.

BETSEY C. SOULE,
*Administratrix of the Estate of Samuel W. Soule.*

Witnesses:
A. S. CROWELL,
CHARLES LINEGAR.